United States Patent [19]

Poblano

[11] 4,137,093
[45] Jan. 30, 1979

[54] SETTING RETARDING COMPOSITION FOR WELL CEMENTING AND RECEMENTING

[75] Inventor: Raul Poblano, Mexico City, Mexico

[73] Assignee: Instituto Mexicano del Petroleo, Mexico City, Mexico

[21] Appl. No.: 814,663

[22] Filed: Jul. 11, 1977

[30] Foreign Application Priority Data

Jul. 26, 1976 [MX] Mexico .................................. 165645

[51] Int. Cl.² ...................... C04B 13/22; C04B 13/24
[52] U.S. Cl. ..................................... 106/315; 106/92; 106/93
[58] Field of Search ..................... 106/315, 314, 93, 92

[56] References Cited

U.S. PATENT DOCUMENTS

| | | | |
|---|---|---|---|
| 3,598,621 | 8/1971 | Ferrara | 106/315 |
| 3,753,748 | 8/1973 | Martin | 106/315 |
| 3,905,826 | 9/1975 | Rosado et al. | 106/93 |

*Primary Examiner*—Winston A. Douglas
*Assistant Examiner*—J. V. Howard
*Attorney, Agent, or Firm*—Finnegan, Henderson, Farabow & Garrett

[57] ABSTRACT

The present invention relates to an improved composition that retards setting in the cementing and recementing of oil well casings, which can be applied at depths that vary between 13123.4 and 21325.5 ft.

The retarding composition is constituted by the following ingredients: sodium or potassium carboxymethylcellulose; sodium tetraborate and Dextrine, it being characterized in that it also contains an inorganic acid such as boric acid.

4 Claims, No Drawings

SETTING RETARDING COMPOSITION FOR WELL CEMENTING AND RECEMENTING

BACKGROUND OF THE INVENTION

In recent years the need to exploit oil resources at very considerable depths has been observed; this phenomenon has been the cause of multiple problems in the drilling and finishing techniques for oil wells, particularly in the application of slurry for cementing and recementing oil wells, since the internal temperature of the well becomes higher as its depth increases, which causes a faster setting of the slurry and makes its handling more difficult.

In the drilling, finishing and repair operations of oil wells cementing of the casings is employed; this technique is conducted by introducing a cement slurry to the bottom of the oil well through the cementing pipe; the slurry is placed in the annular space between the casing and the well walls, where it sets more or less rapidly, depending on the prevailing temperature.

In order to overcome the disadvantages of the immediate setting of the cement slurry, the applicant has carried out research activities.

In U.S. Pat. No. 3,905,826, having the same assignee as the instant invention, a setting retarding composition is described which has as basic ingredients carboxymethylcellulose, dextrine, borax, and optionally organic salts, and it presents as novel feature the fact that it can be applied with good results at depths of up to 13123.4 ft.

OBJECT OF THE INVENTION

It is, therefore, a purpose of the present invention to provide an improved composition for retarding setting which can be applied with good results at operating depths between 13123.4 and 21325.5 ft.

Another object of the present invention is to provide an improved setting retarding composition that can be applied with stable well depth temperature of the order of 392° F.

An additional object of the present invention is to provide a composition that increases the setting time of cement slurries up to five hours or more.

These objects and others that can be accomplished within the scope of the invention, shall be better understood and observed in more detail from the following specification.

DETAILED DESCRIPTION OF THE INVENTION

The improved setting retarding composition of the present invention is constituted by the following ingredients:

|  | weight % |
|---|---|
| Sodium carboxymethylcellulose | 14 to 17 |
| Sodium teraborate | 20 to 23 |
| Dextrine | 25 to 28 |
| Inorganic acid | 35 to 40 |

The inorganic acid selected is boric acid.

In the following examples shown in Tables I through V, there appear the experimental results obtained in the evaluation of a representative composition of the present invention having the following composition:

|  | weight % |
|---|---|
| Sodium carboxymethylcellulose | 14.60 |
| Sodium tetraborate | 21.86 |
| White dextrine | 27.04 |
| Boric acid | 36.50 |

The tests carried out to evaluate the setting retarding composition comprise: thickening time measurings for casing cementing and recementing at depths between 13780 and 20013 ft., considering a temperature gradient of 37° F./328ft.; rheological properties at 80° and 125° F.; compression resistance in a 24 hour time period; and water loss at 995.4 psi differential pressure and at temperatures of 80° and 210° F.

The performed tests were conducted in accordance with the procedures established by the American Petroleum Institute, as shown in report API-RP-10B "recommended practice for testing oil-well cements and cement additives"; for this type of tests, silica flour, cement, and water without chlorides and additives regularly used for the cementing of wells, including sodium chloride, were employed.

The experimental tests were carried out using silica flour in order to avoid the resistance loss which appears in cement when it is subject to high temperatures, since the retarder is applied at temperatures higher than 210° F.

Among the tests that were carried out to evaluate the retarder there was one to determine the compatibility of the product with Hallad —9 and D-19 water loss reducers. (High molecular weight polymers).

Tables I, II and II.—In these Tables are shown the results of the application tests at different well-depth static temperatures of the setting retarding composition in the cementing and recementing of wall casings, regular and short, using different concentrations of the composition. Also, it can be observed that the slurries prepared with the setting retarder are adequate for casing cementing and recementing at depths between 13780 and 20013 ft.

TABLE I

Setting Retarder Dosification For Regular Casing Cementing In Deep Wells (40% Of Silica Flour Is Employed By Cement Weight).
Formulation: 36.5/14.6/21.86/27.04

| Example | Depth (ft.) | Static Temp. (° F.) | Boric Acid | NaCMC | Borax | Dextrine | NaCl Salt (%) | Hallad-9 (High mol. Weight - Polymers) (%) | D-19 (%) | Thickening Time (hrs: min) |
|---|---|---|---|---|---|---|---|---|---|---|
| 1 | 14009.1 | 289.4 | 0.1825 | 0.0730 | 0.1093 | 0.1352 | — | — | — | 3:15 |
|  | " | " | 0.2555 | 0.1022 | 0.15302 | 0.18928 | — | — | — | 4:15 |
|  | " | " | 0.2555 | 0.1022 | 0.15302 | 0.18928 | 5.0 | — | — | 4:00 |
|  | " | " | 0.1825 | 0.0730 | 0.1093 | 0.1352 | — | 0.5 | — | 4:00 |
|  | " | " | 0.1825 | 0.0730 | 0.1093 | 0.1352 | — | — | 0.5 | 4:00 |
| 2 | 14665.3 | 300.2 | 0.3650 | 0.1460 | 0.2186 | 0.2704 | — | — | — | 3:45 |

TABLE I-continued

Setting Retarder Dosification For Regular Casing Cementing In Deep Wells (40% Of Silica Flour Is Employed By Cement Weight).
Formulation: 36.5/14.6/21.86/27.04

| Example | Depth (ft.) | Static Temp. (°F.) | Boric Acid | NaCMC | Borax | Dextrine | NaCl Salt (%) | Hallad-9 (High mol. Weight - Polymers) (%) | D-19 (%) | Thickening Time (hrs: min) |
|---|---|---|---|---|---|---|---|---|---|---|
| | " | " | 0.4380 | 0.1752 | 0.26232 | 0.32448 | 5.0 | — | — | 4:00 |
| | " | " | 0.4380 | 0.1752 | 0.26232 | 0.32448 | — | 0.5 | — | 4:00 |
| | " | " | 0.4380 | 0.1752 | 0.26232 | 0.32448 | — | — | 0.5 | 4:00 |
| 3 | 15321.5 | 309.2 | 0.45625 | 0.1825 | 0.27325 | 0.3380 | — | — | — | 3:00 |
| | " | " | 0.5475 | 0.2190 | 0.3279 | 0.4056 | — | — | — | 4:00 |
| | " | " | 0.5840 | 0.2336 | 0.34976 | 0.43264 | 5.0 | — | — | 4:00 |
| | " | " | 0.5475 | 0.2190 | 0.3279 | 0.4056 | — | 0.5 | — | 4:00 |
| | " | " | 0.5475 | 0.2190 | 0.3279 | 0.4056 | — | — | 0.5 | 4:00 |
| 4 | 16010.4 | 320 | 0.63875 | 0.2555 | 0.38255 | 0.4732 | — | — | — | 3:40 |
| | " | " | 0.7300 | 0.2920 | 0.4372 | 0.5408 | — | — | — | 4:30 |
| | " | " | 0.63875 | 0.2555 | 0.38255 | 0.4732 | 5.0 | — | — | 3:30 |
| 5 | 16676.5 | 330.8 | 0.8030 | 0.3212 | 0.48092 | 0.59488 | — | — | — | 3:30 |
| | " | " | 0.9855 | 0.3942 | 0.59022 | 0.73008 | — | — | — | 4:30 |
| | " | " | 0.9855 | 0.3942 | 0.59022 | 0.73008 | 5.0 | — | — | 4:15 |
| 6 | 17342.5 | 341.6 | 0.9490 | 0.3796 | 0.56836 | 0.70304 | — | — | — | 3:30 |
| | " | " | 1.18625 | .4745 | .71045 | .8788 | — | — | — | 4:30 |
| | " | " | 1.18625 | .4745 | .71045 | .8788 | 5.0 | — | — | 4:15 |
| 7 | 18011.8 | 350.6 | 1.2775 | 0.5110 | 0.7651 | 0.9464 | — | — | — | 4:00 |
| | " | " | 1.4600 | 0.5840 | 0.8744 | 1.0816 | — | — | — | 5:00 |
| | " | " | 1.2775 | 0.5110 | 0.7651 | 0.9464 | 5.0 | — | — | 3:45 |
| | " | " | 1.4600 | 0.5840 | 0.8744 | 1.0816 | 5.0 | — | — | 4:40 |
| 8 | 18996.0 | 365 | 1.18625 | .4745 | .71045 | .8788 | — | — | — | 3:30 |
| | " | " | 1.4600 | 0.5840 | 0.8744 | 1.0816 | — | — | — | 4:30 |
| | " | " | 1.4600 | 0.5840 | 0.8744 | 1.0816 | 5.0 | — | — | 4:15 |
| 9 | 20013.1 | 379.4 | 1.4600 | 0.5840 | 0.8744 | 1.0816 | — | — | — | 4:15 |
| | " | " | 1.6425 | 0.6570 | 0.9837 | 1.2168 | — | — | — | 5:00 |
| | " | " | 1.4600 | 0.5840 | 0.8744 | 1.0816 | 5.0 | — | — | 4:05 |
| | " | " | 1.6425 | 0.6570 | 0.9837 | 1.2168 | 5.0 | — | — | 5:00 |

Slurry density 117.3 lb/ft$^3$ 60% of water is employed by cement weight

TABLE II

Setting Retarder Dosification For Regular Casing Cementing In Deep Wells. (40% Of Silica Flour Is Employed By Cement Weight)
Formulation: 36.5/14.6/21.86/27.04

| Example | Depth (ft) | Static Temp. (°F.) | Boric Acid | NaCMC | Borax | Dextrine | NaCl Salt (%) | Hallad-9 (High Mol. Weight Polymers) (%) | D-19 (%) | Thickening Time (hrs : min) |
|---|---|---|---|---|---|---|---|---|---|---|
| 10 | 14009.1 | 289.4 | 0.2555 | 0.1022 | 0.15302 | 0.18928 | — | — | — | 4:15 |
| | " | " | 0.2555 | 0.1022 | 0.15302 | 0.18928 | 5.0 | — | — | 4:00 |
| | " | " | 0.1825 | 0.730 | 0.1093 | 0.1352 | — | 0.5 | — | 3:15 |
| | " | " | 0.1825 | 0.730 | 0.1093 | 0.1352 | — | — | 0.5 | 3:30 |
| 11 | 14993.4 | 303.8 | 0.45625 | .1825 | .27325 | .3380 | — | — | — | 4:00 |
| | " | " | 0.5475 | 0.2190 | 0.3279 | 0.4056 | — | — | — | 5:00 |
| | " | " | 0.45625 | .1825 | .27325 | .3380 | 5.0 | — | — | 3:45 |
| | " | " | 0.5475 | 0.2190 | 0.3279 | 0.4056 | 5.0 | — | — | 4:30 |
| 12 | 16010.4 | 320 | 0.63875 | .2555 | .38255 | .4732 | — | — | — | 2:50 |
| | " | " | 0.7300 | 0.2920 | 0.4372 | 0.5408 | — | — | — | 4:00 |
| | " | " | 0.7300 | 0.2920 | 0.4372 | 0.5408 | 5.0 | — | — | 3:45 |
| | " | " | 0.63875 | .2555 | .38255 | .4732 | — | 0.5 | — | 3:00 |
| | " | " | 0.63875 | .2555 | .38255 | .4732 | — | — | 0.5 | 3:15 |
| 13 | 17011.1 | 334.4 | 1.00375 | .4015 | .60115 | .7436 | — | — | — | 4:00 |
| | " | " | 1.18625 | .4745 | .71045 | .8788 | — | — | — | 5:00 |
| | " | " | 1.00375 | .4015 | .60115 | .7436 | — | — | — | 3:45 |
| | " | " | 1.18625 | .4745 | .71045 | .8788 | — | — | — | 4:40 |
| 14 | 18011.8 | 350.6 | 1.2775 | 0.5110 | 0.7651 | 0.9464 | — | — | — | 3:45 |
| | " | " | 1.4600 | 0.5840 | 0.8744 | 1.0816 | — | — | — | 5:00 |
| | " | " | 1.2775 | 0.5110 | 0.7651 | 0.9464 | 5.0 | — | — | 3:30 |
| | " | " | 1.4600 | 0.5840 | 0.8744 | 1.0816 | 5.0 | — | — | 4:40 |
| 15 | 18996.0 | 365 | 1.3870 | 0.5548 | 0.83068 | 1.02752 | — | — | — | 4:00 |
| | " | " | 1.6060 | 0.6424 | 0.96184 | 1.18976 | — | — | — | 5:00 |
| | " | " | 1.3870 | 0.5548 | 0.83068 | 1.02752 | — | — | — | 3:45 |
| | " | " | 1.6060 | 0.6424 | 0.96184 | 1.18976 | — | — | — | 4:40 |
| 16 | 20013.1 | 379.4 | 1.4600 | 0.5840 | 0.8744 | 1.0816 | — | — | — | 4:00 |
| | " | " | 1.6425 | 0.6570 | 0.9837 | 1.2168 | — | — | — | 5:00 |
| | " | " | 1.4600 | 0.5840 | 0.8744 | 1.0816 | 5.0 | — | — | 3:45 |
| | " | " | 1.6425 | 0.6570 | 0.9837 | 1.2168 | 5.0 | — | — | 5:00 |

Slurry density 117.3 lb/ft$^3$, 60% of water is employed by cement weight

TABLE III

Setting Retarder Dosification For Regular Casing Cementing In Deep Wells (40% Of Silica Flour Is Employed By Cement Weight).
Formulation: 36.5/14.6/21.86/27.04

| Example | Depth (ft) | Static Temp. (°F.) | % Of Active Ingredient By Cement Weight | | | | NaCl Salt (%) | Water Loss Reducers | | Thickening Time (hrs : min) |
|---|---|---|---|---|---|---|---|---|---|---|
| | | | Boric Acid | NaCMC | Borax | Dextrine | | Hallad-9 (High Mol. Weight Polymers) (%) | D-19 (%) | |
| 17 | 14009.1 | 289.4 | 0.63875 | .2555 | .38255 | .4732 | — | — | — | 4:15 |
| " | " | " | 0.63875 | .2555 | .38255 | .4732 | 5.0 | — | — | 3:40 |
| " | " | " | 0.63875 | .2555 | .38255 | .4732 | — | 0.5 | — | 4:00 |
| " | " | " | 0.63875 | .2555 | .38255 | .4732 | — | — | 0.5 | 4:05 |
| 18 | 14993.4 | 303.8 | 0.8030 | 0.3212 | 0.48092 | 0.59488 | — | — | — | 4:00 |
| " | " | " | 0.9490 | 0.3796 | 0.56836 | 0.70304 | — | — | — | 5:00 |
| " | " | " | 0.82125 | .3285 | 0.49185 | 0.60840 | 5.0 | — | — | 4:00 |
| " | " | " | 0.9855 | .3942 | 0.59022 | 0.73008 | 5.0 | — | — | 5:00 |
| 19 | 16010.4 | 320 | 0.82125 | .3285 | 0.49185 | 0.60840 | — | — | — | 3:00 |
| " | " | " | 1.0950 | 0.4380 | 0.6558 | 0.81120 | — | — | — | 4:30 |
| " | " | " | 0.9125 | 0.3650 | 0.5465 | 0.6760 | 5.0 | — | — | 3:15 |
| " | " | " | 1.0950 | 0.4380 | 0.6558 | 0.81120 | 5.0 | — | — | 4:30 |
| 20 | 17011.1 | 334.4 | 1.1680 | 0.4672 | 0.69952 | 0.86528 | — | — | — | 4:00 |
| " | " | " | 1.36875 | .5475 | 0.81975 | 1.0140 | — | — | — | 5:00 |
| " | " | " | 1.18625 | .4745 | 0.71045 | 0.8788 | 5.0 | — | — | 3:40 |
| " | " | " | 1.36875 | .5475 | 0.81975 | 1.0140 | 5.0 | — | — | 4:45 |
| 21 | 18011.8 | 350.6 | 1.2775 | 0.5110 | 0.7651 | 0.9464 | — | — | — | 3:45 |
| " | " | " | 1.4600 | 0.5840 | 0.8744 | 1.0816 | — | — | — | 4:30 |
| " | " | " | 1.2775 | 0.5110 | 0.7651 | 0.9464 | 5.0 | — | — | 4:30 |
| " | " | " | 1.4600 | 0.5840 | 0.8744 | 1.0816 | 5.0 | — | — | 4:30 |
| 22 | 18996.0 | 365 | 1.4600 | 0.5840 | 0.8744 | 1.0816 | — | — | — | 4:00 |
| " | " | " | 1.6425 | 0.6570 | 0.9837 | 1.2168 | — | — | — | 4:50 |
| " | " | " | 1.4600 | 0.5840 | 0.8744 | 1.0816 | 5.0 | — | — | 4:00 |
| " | " | " | 1.8250 | 0.7300 | 1.0930 | 1.3520 | 5.0 | — | — | 4:40 |
| 23 | 20013.1 | 379.4 | 1.55125 | .6205 | 0.92905 | 1.1492 | — | — | — | 4:00 |
| " | " | " | 1.73373 | .6935 | 1.03835 | 1.2844 | — | — | — | 5:00 |
| " | " | " | 1.55125 | .6205 | 0.92905 | 1.1492 | 5.0 | — | — | 4:00 |
| " | " | " | 1.73375 | .6935 | 1.03835 | 1.2844 | 5.0 | — | — | 5:00 |

Slurry density 117.36 lb/ft³, 60% of water is employed by cement weight

TABLE IV.—In this table are shown the results obtained when the setting retarder is subject to the filtering and rheological properties tests of slurries prepared with the retarder and 40% of silica flour by cement weight.

In these examples it is shown that the setting retarder retains cement slurry water which enables reduction and even elimination of the use of water loss reducers. The rheological properties determined at 80° F. indicate that the slurries are easy to handle during preparation; properties at 125° F. show their behaviour or performance, that is, once they are placed in the well, it is observed that viscosities and yield points decrease, which causes a reduction of friction losses during displacement of slurry to the annular space.

TABLE IV

Results Of The Filtering And Rheological Properties Tests Of Slurries Prepared With Setting Retarder And 40% Of Silica Flour By Cement Weight

| Ex. | Setting Retarder % Of Active Ingredient By Cement Weight | | | | % Of Active Ingredient Water Loss By Cement Weight | | | (ΔP = 995.4 psi) 80° F ft³/30' | Rheological Properties | | | |
|---|---|---|---|---|---|---|---|---|---|---|---|---|
| | | | | | | | | | 80° F | | (125° F) | |
| | Boric Acid | NaCMC | Borax | Dextrine | NaCl Salt | Hallad-9 (High Mol. Wt. polymers) | D-19 | | $\mu_p$* (cp) | $Z_y$ lb/ 100 ft² | $\mu_p$ (cp) | $Z_y$ (lb/ 100 ft²) |
| 24 | 0.1825 | 0.0730 | 0.1093 | 0.1352 | — | — | — | 0.02542 | 60 | 28 | 36 | 50 |
| | 0.1825 | 0.0730 | 0.1093 | 0.1352 | 5.0 | — | — | +0.01412 | 66 | 4 | 38 | 29 |
| | 0.1825 | 0.0730 | 0.1093 | 0.1352 | — | 0.5 | — | 0.00681 | 100 | 14 | 81 | 53 |
| | 0.1825 | 0.0730 | 0.1093 | 0.1352 | — | — | 0.5 | 0.0088 | 42 | 50 | 41 | 52 |
| 25 | 0.3650 | 0.1460 | 0.2186 | 0.2704 | — | — | — | 0.01447 | 52 | 20 | 25 | 25 |
| | 0.3650 | 0.1460 | 0.2186 | 0.2704 | 5.0 | — | — | +0.01412 | 44 | 5 | 35 | 24 |
| | 0.3650 | 0.1460 | 0.2186 | 0.2704 | — | 0.5 | — | 0.01235 | 120 | 23 | 66 | 44 |
| | 0.3650 | 0.1460 | 0.2186 | 0.2704 | — | — | 0.5 | 0.01197 | 93 | 15 | 50 | 50 |
| 26 | 0.7300 | 0.2920 | 0.4372 | 0.5408 | — | — | — | 0.00918 | 60 | 16 | 28 | 20 |
| | 0.7300 | 0.2920 | 0.4372 | 0.5408 | 5.0 | — | — | +0.01412 | 52 | 6 | 28 | 14 |
| 27 | 1.0950 | 0.4380 | 0.6558 | 0.8112 | — | — | — | 0.00423 | 83 | 13 | 33 | 6 |
| | 1.0950 | 0.4380 | 0.6558 | 0.8112 | 5.0 | — | — | 0.01341 | 68 | 7 | 27 | 4 |
| 28 | 1.2775 | 0.5110 | 0.7651 | 0.9464 | — | — | — | 0.00247 | 90 | 16 | 38 | 4 |
| | 1.2775 | 0.5110 | 0.7651 | 0.9464 | 5.0 | — | — | 0.01341 | 70 | 8 | 27 | 5 |
| 29 | 1.4600 | 0.5840 | 0.8744 | 1.0816 | — | — | — | 0.00211 | 100 | 21 | 42 | 2 |
| | 1.4600 | 0.5840 | 0.8744 | 1.0816 | 5.0 | — | — | 0.01341 | 74 | 10 | 28 | 5 |
| 30 | 1.6425 | 0.6570 | 0.9837 | 1.2168 | — | — | — | 0.00141 | 110 | 26 | 46 | 0 |

Slurry density 117.3 lb/ft³, 60% of water is employed by cement weight*
$\mu_p$-Viscosity;
$Z_y$-yield point.

TABLE V.—In this Table are shown the results obtained when the retarding composition is subject to compression resistance tests in a 24 hour interval. The retarder is used at different concentrations according to the well depth and stable temperature, with mixtures prepared from cement and silica flour.

According to the results shown in the aforementioned Table, it is observed that the mixtures of cement, silica flour and retarder acquire high resistances after 24 hours of their preparation.

TABLE V

Results Of The Compression Resistance Tests At 24 Hours Of Slurries Prepared With Setting Retarder And 40% Of Silica Flour By Cement Weight

| Example | Depth (ft) | Static Temp. (°F.) | Setting Retarder % Of Active Ingredient By Cement Weight | | | | Water Loss Reducers | | | Compression Resistance Tests At 24 Hours psi |
|---|---|---|---|---|---|---|---|---|---|---|
| | | | Boric Acid | NACMC | Borax | Dextrine | NaCl Salt (%) | Hallad-9 (%) | D-19 (%) | |
| 31 | 14009.1 | 289.4 | 0.1825 | 0.0730 | 0.1093 | 0.1352 | — | — | — | 3256.38 |
| " | " | " | 0.1825 | 0.0730 | 0.1093 | 0.1352 | — | 0.5 | — | 2445.84 |
| " | " | " | 0.1825 | 0.0730 | 0.1093 | 0.1352 | — | — | 0.5 | 1592.64 |
| " | " | " | 0.2555 | 0.1022 | 0.15302 | 0.18928 | — | — | — | 2844.0 |
| " | " | " | 0.2555 | 0.1022 | 0.15302 | 0.18928 | 5.0 | — | — | 2915.1 |
| " | " | " | 0.5475 | 0.2190 | 0.3279 | 0.4056 | — | — | — | 625.68 |
| 32 | 16010.4 | 320 | 0.63875 | 0.2555 | 0.38255 | 0.4732 | — | — | — | +1791.72 |
| " | " | " | 0.63875 | 0.2555 | 0.38255 | 0.4732 | 5.0 | — | — | +3924.72 |
| " | " | " | 0.63875 | 0.2555 | 0.38255 | 0.4732 | — | 0.5 | — | +3441.24 |
| " | " | " | 0.63875 | 0.2555 | 0.38255 | 0.4372 | — | — | 0.5 | +2616.48 |
| " | " | " | 0.7300 | 0.2920 | 0.4372 | 0.5408 | — | — | — | 1791.72 |
| " | " | " | 0.7300 | 0.2920 | 0.4372 | 0.5408 | 5.0 | — | — | 3924.72 |
| " | " | " | 1.0950 | 0.4380 | 0.6558 | 0.8112 | 5.0 | — | — | 2866.66 |
| 33 | 18011.8 | 350.6 | 1.0950 | 0.4380 | 0.6558 | 0.8112 | — | — | — | 7309.08 |
| " | " | " | 1.2775 | 0.5110 | 0.7651 | 0.9464 | — | — | — | 6214.14 |
| " | " | " | 1.4600 | 0.5840 | 0.8744 | 0.0816 | — | — | — | 5133.42 |
| " | " | " | 1.2775 | 0.5110 | 0.7651 | 0.9464 | 5.0 | — | — | |
| " | " | " | 1.4600 | 0.5840 | 0.8744 | 1.0816 | 5.0 | — | — | |
| 34 | 20013.1 | 379.4 | 1.4600 | 0.5840 | 0.8744 | 1.0816 | — | — | — | 6541.2 |
| " | " | " | 1.6425 | 0.6570 | 0.9837 | 1.2168 | — | — | — | 5645.34 |
| " | " | " | 1.8250 | 0.7300 | 0.930 | 1.3520 | — | — | — | 4749.48 |
| " | " | " | 1.4600 | 0.5840 | 0.8744 | 1.0816 | 5.0 | — | — | 2374.74 |
| " | " | " | 1.6425 | 0.6570 | 0.9837 | 1.2168 | 5.0 | — | — | 2317.86 |
| " | " | " | 1.8250 | 0.7300 | 1.0930 | 1.3520 | 5.0 | — | — | 2275.2 |

Slurry density 117.36 lb/ft³, 60% of water is employed by cement weight

TABLE IV.—In the following Table, comparative results are shown of the efficiency of the retarder of the present invention, in comparison with other known retarders, thereby illustrating the properties presented by the new retarder are superior to those of other commercial products (A and B).

TABLE VI

Setting Retarder Efficiency In Comparison With Two Commercial Products "A" And "B". 40% Of Silica Flour is Employed By Cement Weight.

| Additive | Additive Concentration By Cement Weight (%) | Thickening Time C-10 (hr:min) | Water Loss (ΔP = 995.4 psi) T = 210° F. ft³/30' | Compression Resistance At 24 Hrs C-10S psi | Plastic Viscosity 80° F. (cp) | Yield Point 80° F. psi |
|---|---|---|---|---|---|---|
| New retarder | 3.0 | 3:30 | .0024 | 4450.86 | 83 | 0.0090 |
| A | 3.0 | 3:40 | 0.0234 | 2360.52 | 106 | 0 |
| B | 3.0 | 2:30 | 0.0191 | 2630.7 | 92 | 0.0180 |
| Efficiency (%) of new retarder in comparison with A | | 95 | 0.03347 | 2673.36 | * | * |
| Efficiency of new retarder in comparison with B | | 140 | 0.0273 | 2403.18 | 110 | 2.8440 |

* These were not calculated, since slurries with 3% by weight of product A behave as dilatant fluids. Under these conditions, their use in cementing is disadvantageous.

According to the retarder performance in the thickening time tests, it is shown that the additive of the present invention can be successfully used at stable well depth temperatures of the order of 392° F.

Also, if concentrations of the retarding additive higher than 4.5% by cement weight are used, the setting of the slurry can be retarded for a period of time longer than five hours, at depths of 20013 ft.

The following can be cited as additional advantages of the retarder of the present invention:

The setting retarder is compatible with products regularly used in the cementing of oil-well casings.

Elimination or partial reduction of the use of water loss reducing agents.

Reduction of friction losses during displacement of the retarder to annular space.

The retarder does not produce foam during slurry preparation; consequently, the use of anti-foaming agents is eliminated.

Finally, it is evident that slurries prepared with silica flour and the retarder can be used safely in the cementing of casings, since they present a resistance higher than 497.7 psi, which are commendable to continue the drilling or finishing of an oil-well.

I claim:

1. An improved setting retarding composition for cementing and recementing of wells, which comprises: from 13 to 17% by weight of carboxymethyl cellulose, from 20 to 23% by weight of sodium tetraborate, from 25 to 27% by weight of dextrine; characterized in that it also contains from 35.0 to 40% by weight of boric acid.

2. An improved setting retarding composition for cementing and recementing of wells according to claim 1, characterized in that it comprises: 14.60% of carboxymethylcellulose, 21.86% of sodium tetraborate, 27.4% of dextrine and 36.5% of boric acid.

3. An improved setting retarding composition for cementing and recementing of wells according to claim 1, characterized in that the carboxymethyl cellulose is preferably sodium or potassium carboxymethyl cellulose.

4. An improved setting retarding composition for cementing and recementing of wells according to claim 2, characterized in that the carboxymethyl cellulose is preferably sodium or potassium carboxymethyl cellulose.

* * * * *